US 9,198,225 B2

(12) United States Patent
Bilcu et al.

(10) Patent No.: US 9,198,225 B2
(45) Date of Patent: Nov. 24, 2015

(54) AD-HOC SURVEILLANCE NETWORK

(75) Inventors: Radu Bilcu, Tampere (FI); Pasi Ojala, Kirkkonummi (FI)

(73) Assignee: Nokia Technologies Oy, Espoo (FI)

( * ) Notice: Subject to any disclaimer, the term of this patent is extended or adjusted under 35 U.S.C. 154(b) by 175 days.

(21) Appl. No.: 13/516,171

(22) PCT Filed: Dec. 18, 2009

(86) PCT No.: PCT/FI2009/051016
§ 371 (c)(1),
(2), (4) Date: Jun. 14, 2012

(87) PCT Pub. No.: WO2011/073499
PCT Pub. Date: Jun. 23, 2011

(65) Prior Publication Data
US 2012/0250581 A1  Oct. 4, 2012

(51) Int. Cl.
*H04W 16/00* (2009.01)
*H04W 84/18* (2009.01)
*G08B 25/00* (2006.01)
*H04W 40/24* (2009.01)
*H04L 29/08* (2006.01)

(52) U.S. Cl.
CPC ............. *H04W 84/18* (2013.01); *G08B 25/009* (2013.01); *H04L 67/12* (2013.01); *H04W 40/24* (2013.01)

(58) Field of Classification Search
CPC .............................. H04W 16/14; H04W 84/18
USPC ................. 370/254, 256, 328, 255, 252, 338; 709/223, 224
See application file for complete search history.

(56) References Cited

U.S. PATENT DOCUMENTS

| | | | |
|---|---|---|---|
| 7,315,739 B2 * | 1/2008 | Burch et al. | 455/420 |
| 7,383,019 B1 * | 6/2008 | Thorsted et al. | 455/11.1 |
| 7,504,940 B2 * | 3/2009 | Luebke et al. | 340/539.26 |
| 7,532,542 B2 | 5/2009 | Baxter et al. | |
| 7,860,922 B2 * | 12/2010 | Singer et al. | 709/203 |
| 7,984,185 B2 * | 7/2011 | Xu | 709/245 |
| 8,060,018 B2 * | 11/2011 | Davis et al. | 455/41.3 |
| 8,339,991 B2 * | 12/2012 | Biswas et al. | 370/254 |
| 8,427,309 B2 * | 4/2013 | Bullard et al. | 340/540 |
| 2003/0182446 A1 * | 9/2003 | Koide et al. | 709/238 |
| 2003/0236866 A1 * | 12/2003 | Light | 709/220 |
| 2004/0028023 A1 * | 2/2004 | Mandhyan et al. | 370/351 |
| 2006/0088012 A1 * | 4/2006 | Ganesh | 370/338 |

(Continued)

FOREIGN PATENT DOCUMENTS

KR    2009-0078889 A    7/2009

OTHER PUBLICATIONS

Eronen et al., "Audio-Based Context Recognition", IEEE Transactions on Audio, Speech, and Language Processing, vol. 14, Issue 1, Jan. 2006, pp. 321-329.

(Continued)

*Primary Examiner* — Rasheed Gidado
(74) *Attorney, Agent, or Firm* — Alston & Bird LLP

(57) ABSTRACT

A method and related apparatuses, the method comprising: setting up a network of a plurality of mobile devices (208); obtaining sensory data from at least one mobile device of the network (210); analyzing the obtained sensory data in order to detect at least one predetermined event (212); and in response to detecting at least one predetermined event (214), providing an indication about the detected event to at least one mobile terminal of the network.

20 Claims, 2 Drawing Sheets

(56) References Cited

U.S. PATENT DOCUMENTS

Figure 1:
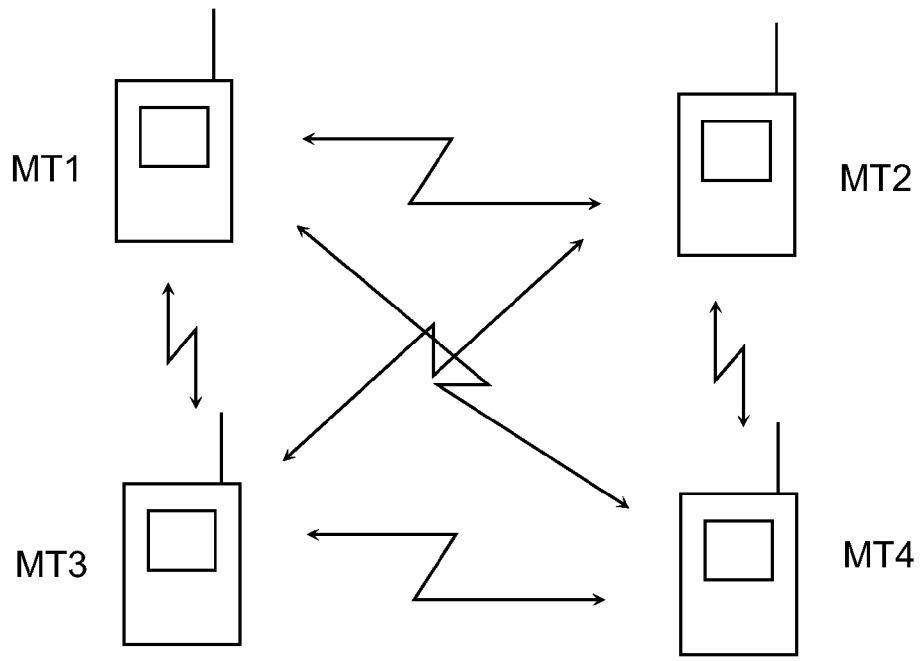

| | | | |
|---|---|---|---|
| 2007/0168471 A1* | 7/2007 | Childress et al. | 709/220 |
| 2007/0171913 A1* | 7/2007 | Luo | 370/395.2 |
| 2007/0205888 A1* | 9/2007 | Lee et al. | 340/539.18 |
| 2007/0258472 A1* | 11/2007 | Eklund | 370/401 |
| 2008/0089298 A1* | 4/2008 | Anschutz et al. | 370/338 |
| 2008/0182587 A1 | 7/2008 | Bennett | |
| 2009/0005077 A1 | 1/2009 | Forstall et al. | |
| 2009/0227287 A1 | 9/2009 | Kotidis | |
| 2009/0264150 A1* | 10/2009 | Andreasson et al. | 455/556.1 |
| 2011/0004889 A1* | 1/2011 | Medeiros et al. | 719/330 |

OTHER PUBLICATIONS

International Search Report and Written Opinion received for corresponding International Patent Application No. PCT/FI2009/051016, dated Sep. 24, 2010, 13 pages.

* cited by examiner

AD-HOC SURVEILLANCE NETWORK

RELATED APPLICATION

This application is a National Phase Entry of International Application No. PCT/FI2009/051016, filed Dec. 18, 2009.

FIELD OF THE INVENTION

The present invention relates to surveillance networks, and more particularly to an ad-hoc surveillance network.

BACKGROUND OF THE INVENTION

Various surveillance and monitoring systems utilizing a plurality of sensors, for example, cameras, audio sensors/microphones and motion detectors have become more common during the last decade. Such a system is typically operated through a control node, for example a server or a central computer device, to which the plurality of sensors are connected via a network providing a transmission path for providing the sensory data to the control point. A wireless transmission path can be provided, for example, via a Bluetooth, IR, WIFI, WLAN or cellular connection. In a wireless surveillance network, the network configuration may thus be modified by changing the number and the location of the sensors within the network.

However, in every-day life there are situations wherein a surveillance system should be initiated quite quickly, on ad-hoc basis. For example, a group of people travelling and/or residing in an unknown area, e.g. in rural areas, may want to detect certain movements and sounds in the surroundings. Naturally, such situations happen unexpectedly and very occasionally, and thus it is unreasonable to expect people to carry along devices of a dedicated surveillance system. Besides, in most such ad-hoc situations it may be practically and/or technically impossible to establish a network of surveillance sensors; consider, for example, a group of hunters who want to detect voices of certain animals.

Thus, there is a need for a surveillance network, which can be easily established on ad-hoc basis.

SUMMARY OF THE INVENTION

Now there has been invented an improved method and technical equipment implementing the method, by which a surveillance network can be easily established on ad-hoc basis. Various aspects of the invention include a method, an apparatus and a computer program, which are characterized by what is stated in the independent claims. Various embodiments of the invention are disclosed in the dependent claims.

According to a first aspect, there is provided a method comprising: setting up a network of a plurality of mobile devices; obtaining sensory data from at least one mobile device of the network; analysing the obtained sensory data in order to detect at least one predetermined event; and in response to detecting at least one predetermined event, providing an indication about the detected event to at least one mobile terminal of the network.

According to an embodiment, the step of setting up the network comprises: determining, by a first mobile device, candidate devices suitable for establishing the network; requesting one or more candidate devices to be included in the network; and establishing data transfer connections at least between said first mobile device and each of the candidate devices accepting the request.

According to an embodiment, the step of determining candidate devices suitable for establishing the network comprises: detecting mobile devices within a predetermined geographical area; and selecting, from the group of detected mobile devices, candidate devices suitable for establishing the network.

According to an embodiment, the predetermined geographical area is determined by a distance relative to the first mobile device or by positioning data relative to a geographical area.

According to an embodiment, the step of obtaining sensory data comprises capturing sensory data.

According to an embodiment, the step of obtaining sensory data comprises receiving sensory data from one or more mobile devices.

According to an embodiment, the sensory data comprises location information associated with the sensory data.

According to an embodiment, providing an indication about the detected event comprises informing a user of at least one mobile device of the network by an alarm about the detected event According to an embodiment, the sensory data comprises at least audio signals, and analysing the sensory data comprises: extracting a pattern characterizing the temporal spectral components of an audio segment of an audio signal; comparing the extracted pattern to the predetermined set of audio content patterns of various audio source classes; and in response to the extracted pattern matching with one of patterns in the predetermined set of audio content patterns, classifying the audio segment to belong to a respective audio source class.

According to an embodiment, in response to the extracted pattern matching with one of patterns in the predetermined set of audio content patterns under surveillance, invoking an alarm in at least one of the mobile devices of the network.

The arrangement according to the invention provides significant advantages. It provides a totally new concept for establishing an ad-hoc surveillance network utilizing apparatuses, which people usually carry along. Thus, there is no need for any dedicated, typically costly surveillance network devices. The network can be established anywhere, provided only that there is a communication connection available between the mobile terminals. Furthermore, the embodiment relating to audio monitoring provides a flexible audio monitoring system applicable and adjustable practically anywhere.

According to a second aspect, there is provided an apparatus an apparatus comprising a communication unit for setting up a network of a plurality of mobile devices; an input unit for obtaining sensory data from at least one mobile device of the network; a processing unit for analysing the obtained sensory data in order to detect at least one predetermined event; said processing unit being arranged to provide, in response to detecting at least one predetermined event, an indication about the detected event to at least one mobile terminal of the network.

According to a third aspect, there is provided an apparatus comprising a communication unit for receiving a request to be included in a network of a plurality of mobile devices and for accepting said request; said communication unit being arranged to establish a data transfer connection to at least the mobile device sending said request; one or more sensors for obtaining sensory data about the surroundings of the apparatus; said communication unit being further arranged to send the obtained sensory data to at least one mobile device in said network.

As further aspects of the invention, there are provided computer program products for carrying out the steps of the method in said apparatuses.

These and other aspects of the invention and the embodiments related thereto will become apparent in view of the detailed disclosure of the embodiments further below.

LIST OF DRAWINGS

Figure 3:
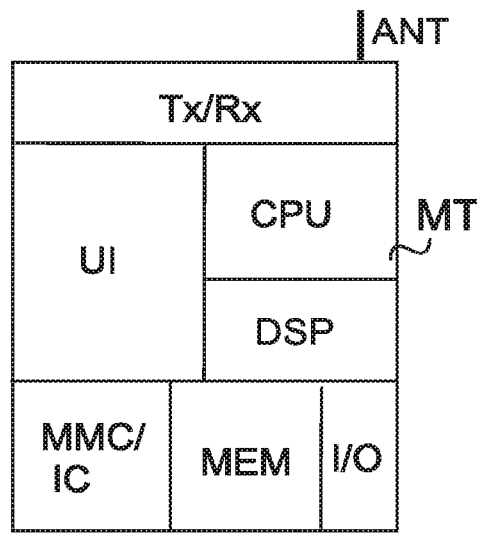
Figure 2:
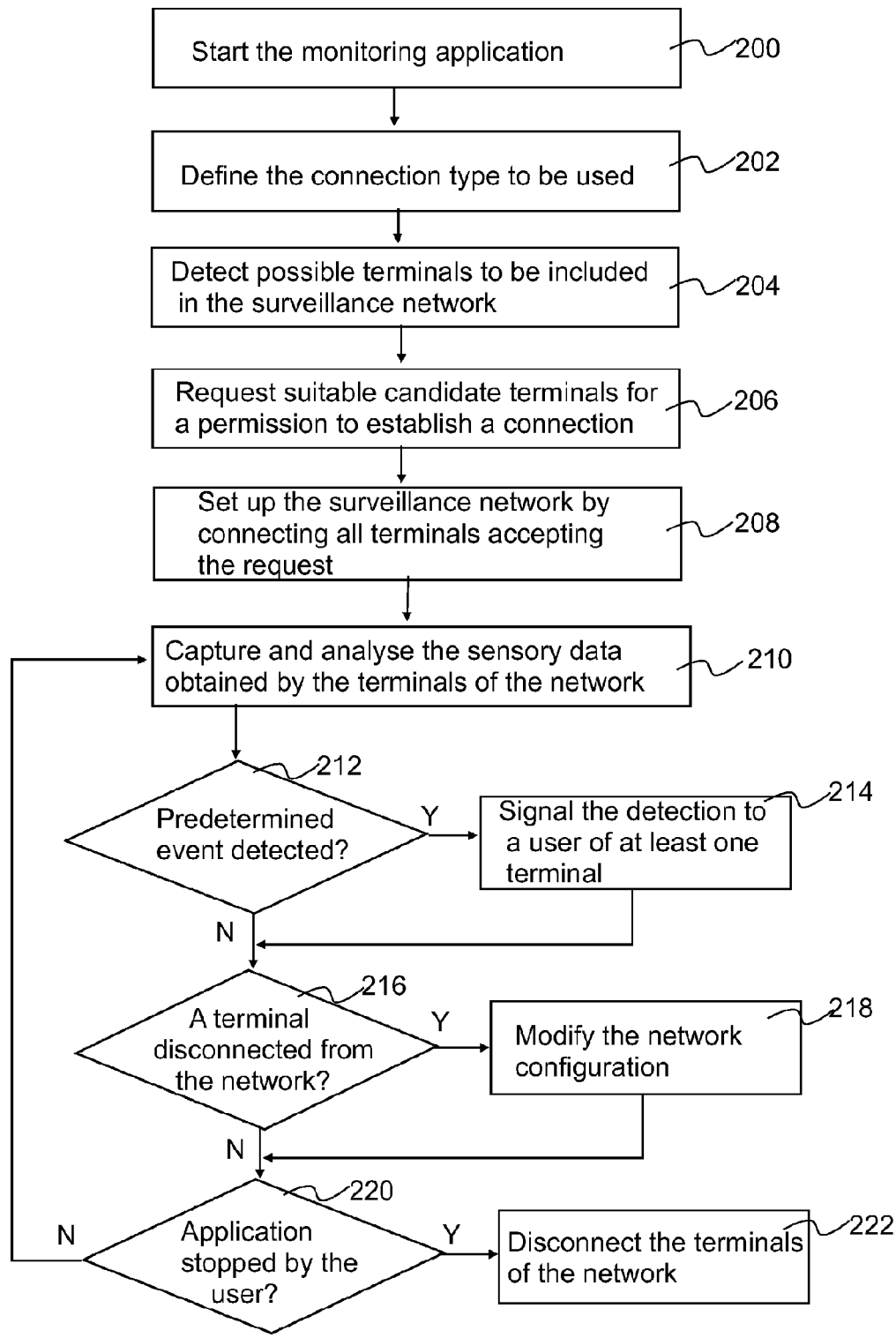

In the following, various embodiments of the invention will be described in more detail with reference to the appended drawings, in which FIG. 1 shows a basic configuration for a surveillance network according to the embodiments;

FIG. 2 shows a flow chart of the operation of the surveillance network according to various embodiments of the invention; and FIG. 3 shows a simplified structure of an apparatus (TE) capable of operating as a mobile device in the system according to the embodiments.

DESCRIPTION OF EMBODIMENTS

FIG. 1 illustrates a basic configuration for a surveillance network according to the following embodiments. A plurality of mobile devices (MT1-MT4), each comprising a sensory data monitoring application, are arranged to establish a mutual network, wherein each mobile devices preferably has connections with each of the other devices in the network. Alternatively, it is possible that one of the devices operates as a master device managing the surveillance network, whereby it would suffice that the master device has connections with each of the remaining devices.

One of the mobile devices (e.g. MT1) initiates the setup of the surveillance network by starting its sensory data monitoring application. The application defines the type of the connection the mobile device will use, searches candidate devices (MT2-MT4) for setting up the network, requests one or more of the candidate devices to be included in the surveillance network, and establishes connections to those candidate devices accepting the request.

The means for establishing the connections between the devices is not relevant for the embodiments, but any possible connection type can be used, such as Bluetooth, WIFI, infra red, cellular network, cable, etc. Upon setting up the network, the candidate devices accepting the request and thus included in the surveillance network each initiate their own sensory data monitoring application. A mobile device participating in the surveillance network may comprise one or more sensors capable of producing sensory data meaningful for surveillance monitoring. The sensors may comprise a still or video camera, an audio sensor/microphone, a motion detector, a temperature sensor, a humidity sensor, etc.

The sensory data monitoring application of terminal mobile device in the surveillance network may analyse the sensory data captured by one or more of its sensors, seeking to detect certain predetermined events, such as a predetermined audio pattern or exceeding of a threshold value of a sensor parameter. Alternatively, a mobile device in the surveillance network may provide the captured sensory data for another mobile device in the surveillance network for analysis. A mobile device carrying out the analysis of the sensory data may or may not capture sensory data. Thus, a mobile device in the surveillance network may carry out both the capture and analysis of sensory data, may carry out only capture of sensory data or may carry out only analysis of sensory data. Furthermore, a mobile device carrying out capturing of sensory network may capture sensory data only part of the time. Yet further, a mobile device in the sensory network may not carry out capturing of sensory data nor analysis of sensory data, but may only wish to receive information regarding events detected within the sensory network.

Based on the detected events, the sensory data monitoring application decide the action to be taken by one or more mobile devices in the surveillance network. For example, one or more mobile devices in the surveillance network may be informed about the detected event. Consequently, the mobile devices informed about the detected event may be set to ring a specific melody when a possibly dangerous event is detected in the surveillance network. The location of the detected event could be displayed on a mobile device using the knowledge about the location of the particular device carrying out the detection in the network.

The processing of the captured sensory data can be done in a distributed manner, wherein a mobile device of the surveillance network analyses its own sensory data, or in a centralized manner, wherein the sensory data, captured by a device in the surveillance network, is provided to another master device in the surveillance network acting as an analysis device for analysis Consequently, the mobile device acting as an analysis device analyses the sensory data and extracts the meaningful information from data obtained from one or more mobile devices in the surveillance network. Moreover, according to an embodiment, the extracted information may also be provided to an external device (mobile phone, laptop) of one of the participants, or to a web account, such as to Ovi® service, in order to signal to the user about the detected event.

Next, various embodiments are described more in detail by referring to the flow chart of FIG. 2. In this example, the embodiments relate to detecting audio events in the area to be monitored. However, the same operating principle applies to handling of any other surveillance sensory data, such as carrying out movement or pattern recognition from the data supplied by cameras and/or motion detectors. Furthermore, the mobile devices in the surveillance network may be configured to detect sensory data of different type. As an example, one or more mobile devices in the sensory network may use microphone(s) to capture audio data, one or more mobile devices in the sensory network may capture video data, and one or more mobile devices in the sensory network may employ humidity sensors.

First, the user of the mobile device initiates (200) the monitoring application. The user may start the application, for example, from the menu of his/her mobile device, which can be e.g. a mobile phone, a PDA device or portable computer. According to an embodiment, the actual application may be located in a remote server and the user may run the application remotely, e.g. via a web account.

The application preferably prompts (202) the type of the connection that the user wants to use between the devices being part of the network. Depending on the properties of the mobile device, the connection type could be selected from a plurality of options, such as: Bluetooth, WIFI, infra red (IR), GSM/3G or other possible types of connections. Furthermore, the mobile device may use different types of connection for connecting to devices requested to become part of the network. As an example, the mobile device may connect to a first group of one or more devices using Bluetooth and connect to a second group of one or more devices using GSM/3G. According to an embodiment, the connection type selected by the user is independent of the connection types selected by the users of other devices becoming part of the network, since none of the users has advance information about the devices possibly becoming part of the network. For instance, the user can select that the connection between its device and the other devices in the network to be established will be WIFI, while the other devices could use e.g. Bluetooth in their mutual connection.

According to another embodiment, the user operating the master device could decide the type of connection established between all devices of the network. For example, if a single person has several mobile devices, he/she could set the type of the connection between all the devices, at once, from the master device. In this way, the user can choose e.g. the cheapest type of connection and he/she does not have to set the type of the connection for each pair of mobile devices separately.

Next, the device starts, either automatically or in response to a user command, to detect (204) other mobile devices that could be added to the network. According to an embodiment, the detection is based on the distance to the device on which the application has been started. For instance, if the Bluetooth connection was selected all the devices that are situated within the Bluetooth range are detected.

According to another embodiment, satellite positioning, such as GPS data, or positioning data provided by a cellular network can also be utilized to detect the devices situated in the vicinity. This would be useful in situations when it is desirable to cover a geographical area beyond the coverage of Bluetooth. Thus, it is possible to request that devices situated at certain distance and/or certain geographical position will be detected. According to an embodiment, the user may be provided with a map shown on the display of his/her device to define the geographical region, from which the devices will be selected.

According to a further embodiment, the devices to be selected as candidate devices for the network are defined automatically from the group of the detected devices. According to an embodiment, devices situated at a certain distance, e.g. at least 10 meters, from each other can be automatically selected. Consequently, the problem of selecting too many devices situated basically in the same place is eliminated.

In another embodiment, the selection of the devices can be based on the type of device, e.g. the hardware capabilities of a certain device. For example, if the master device detects 5 devices in the neighborhood which are situated very close to each other, the master device may decide that only one or two of these devices will be selected. Furthermore, the devices having better hardware capabilities may be prioritized in the selection (e.g. devices which are known to have better audio microphones and recording hardware, higher quality imaging sensors, higher processing power or larger memory, etc). The information about the hardware capabilities of the neighbouring devices could be obtained by the master devices sending a request to each of the neighbouring devices or by other means. Naturally, other criteria for the automatic selection of the candidate devices for the network can be used as well.

According to another embodiment, the user initiating the monitoring application is provided with the possibility to manually select the candidate devices from the group of the detected devices. For example, a list of the neighbouring devices (e.g. the ones that are within the Bluetooth range) may be displayed to the user, from which the user selects the desired ones. In the manual selection mode also the hardware capabilities of the candidate devices can be shown to the user. For example, if the type of the device is shown as a Bluetooth name of the device, e.g. Bluetooth name: UserX_N71, the device type N71 can be used, by the master device, to obtain the available hardware description of the device type N71 e.g. by searching from Internet.

According to another embodiment, especially when operating beyond the Bluetooth coverage, the user may identify the desired candidate devices, for example, by entering the phone number of the desired devices or by selecting devices with phone numbers saved in the phone book of his/her device. Alternatively or additionally, the candidate devices may be selected using e.g. a pre-determined list of users and/or devices.

In order to establish the surveillance network, the device in which the application has been started, sends a request (206) to each of the candidate devices to ask a permission to establish a connection. According to an embodiment, in response to receiving the request, the user of a candidate device may prompt the user of the candidate device to accept or reject the request to include the device to the surveillance network. As an example, a window may be opened on the display of a candidate device and the user of the candidate device is prompted to accept or reject the request to include the device to the surveillance network.

According to an embodiment, the candidate device may accept the connection requests automatically, if certain predefined criteria are met. For example, the devices may maintain a list of trusted devices, whereby a request from such trusted device is automatically accepted. It is also possible to automatically accept an anonymous request, if the admission criteria of the network facilitator are met. For example, an anonymous request to include the device in a surveillance network for a certain period of time within certain location may be automatically accepted. Furthermore, the admitted surveillance may be limited to some particular type of audio content such as breaking glass, or slamming a door.

Then the device, in which the application has been started, establishes (208) the surveillance network by connecting all the candidate devices accepting the request to be included in the surveillance network. In the network, all devices are preferably, but not necessarily, mutually connected to other devices in the network. The connection types established between the members of the network are preferably the same as defined when starting the application.

The initiating device may send to each of the devices having accepted the request to be included in the surveillance network information about one or more other devices having accepted the request to be included in the surveillance network in order to enable other devices to establish connections between each other. This information may be e.g. the phone number, Bluetooth identification, IP address, or any other type of information that enables identifying the devices. Devices having accepted the request to be included in the surveillance network may connect to other devices having accepted the request based on this information.

In another embodiment, the candidate devices are not accepted or rejected only by the device on which the application has been started/initiated, but the decision is made based on a voting algorithm. For instance, a first device that has started/initiated the application can solely accept/select a second device to be part of the network. The first device (the initiator of the application) and the second device (the one accepted by the initiator in the previous stage) may jointly decide whether to accept a third device to be included in the surveillance network or not. Alternatively, more than two devices may be involved in joint decision. Such a joint selection may require that both or all of the devices participating in the decision making may need to accept the third device in order it to be accepted to be included in the surveillance network. As an example, if the first device (the initiating device) sees a candidate device—a third device—in the Bluetooth range but the second device (accepted to the surveillance network) sees that the third device is too close to it, the third device is rejected.

The user may preferably define and store the location of his/her device within the network. Based on the GPS coordinates, cell ID or given address, for example, a map will be displayed to the user in which the location can be marked. As an alternative, the location of the device may be automatically estimated without input from the user based on e.g. GPS coordinates, cell ID, directional antennas, etc. In a similar manner, the user may also define and store the location of the other devices relative to his/her own position. In human-built surroundings, such as in hotels, the surveillance service could be tailored for the user so that, for example, the room layout is stored in the system. In addition or alternatively, the user may enter the hotel room number in the system.

Once the surveillance network has been set up, the devices included in the network start to capture (210) sensory data, in this example audio sequences using the microphones of the devices. According to an embodiment, only short portions of the audio signals (e.g. audio signals recorded during the last 1 minute) are kept in the memory in order to utilize the memory efficiently. The captured segments are processed and information extracted from them. An example of information that can be extracted is a pattern (for example in a form of a vector) that characterizes the temporal spectral components of the audio segment and/or signal level characteristics. This time-frequency pattern can advantageously be utilized to classify the captured signals. For example, the captured signal can be classified as coming from a car, an animal or any other audio source.

The classification can be done by comparing the detected pattern with a set of patterns stored in advance into the device using, for example, a speech recognition engine. Another example of an audio content classification is a context recognition engine, which is disclosed more in detail in the publication "Audio-based context recognition", Eronen A et al., IEEE Transactions on audio, speech and language processing, Vol. 14. No 1, January 2006. The context of each device in the network can be constantly monitored and classified. The recogniser may, for example, have predetermined classes for fire hazard, breaking glass, intruder, screaming voices etc. which would invoke an emergency message in the network.

According to an embodiment, the direction of arrival (DOA) of the sound can also be estimated and then based on the fact that the network contains more than one device, the location of the sound event may also be determined. For determining the DOA, a directional microphone array consisting of two or more microphones, preferably mounted on the device could be used. Typically, the use of e.g. 3, 4, 5 or more microphones provides improved directional selectivity. In estimating the DOA of the sound, a generally known technique referred to as beamforming can be utilised, wherein the DOA of the audio source can be extracted using so-called beamforming algorithms.

However, as a simplified approximation the location of the sound event may be determined to be the same as the location of the device detecting the sound event. According to an embodiment, each audio segment is processed in the device capturing the audio segment. According to an alternative embodiment, the audio segments are transmitted to one of the devices belonging to the network (called a master device) which processes all the audio segments and extracts the corresponding patterns and the DOA or the location of the sound event.

According to an embodiment, the surveillance may be based on a plurality of types of sensory data, thus enabling to apply the multimodality of the mobile device to detect emergency situation. For example, the mobile device could detect a change in temperature or a sudden movement of the device combined with loud voices. Humidity sensor could detect water leaks, or danger that the device is left into rain.

When carrying out the monitoring, if an audio event is detected (212), this is signalled (214) to at least one user, but preferably to all users of the devices in the network. For example, if during the processing of the audio signals it is noticed that a detected pattern is similar to a pattern stored in the device, or if the context recognition detects a hazardous audio event, the device carrying out the processing will signal the user of the device about the detected event, e.g. by generating an alarm sound and displaying information about the event and preferably also about the location of the event. According to another embodiment, the devices that have detected an audio event of interest send alarm messages to the master device, preferably together with the DOA of the event. Then the master device will signal the detection of an event to at least the user of the master device, or to all devices of the network. For example, in the case of anonymous surveillance network described above, the user of the master device may be the only one interested in receiving the alarms, and it is thus not necessary to signal the detection of the event to other devices of the network.

Perhaps in a more typical use case, the detection of the event is signalled to the other devices of the network. The signalling preferably includes at least an estimation of the location of the sound event, which may be shown to the users of the other devices e.g. on a map view on the display.

The surveillance network may include a setting preventing normal telephone calls from participants of the surveillance network in order to preserve the privacy. Nevertheless, the setting may allow automatic or user-initiated calls or call attempts to emergency number (e.g. 112 or 911), if a possibly dangerous event is detected.

According to an embodiment, when at least one but not all devices is disconnected (216) from the network, e.g. due to the owner of the device purposefully disconnecting the device or an accidental network interruption, the connections between the disconnected device(s) and remaining devices in the network are interrupted, but the application will continue running and the configuration of the network within the application is modified (218) accordingly. Thus, the remaining devices of the network will continue to capture and analyze audio signals and react accordingly to the detected events.

However, if the application is stopped (220) in the device initially starting the application e.g. by the user of said device purposefully stopping the application, or said device is disconnected from the network, then the application and the connections between all the devices of the network are interrupted (222) and the remaining devices also refrain from running the application anymore.

As a further field of application, instead of monitoring certain audio events, the created surveillance network can be applied for observing an audio scene within a certain location. The area to be observed could be for example marked on the map view and the connected device in the vicinity of the given area will provide the audio feed. If e.g. a microphone array (on at least one of the devices) and/or more than one device are used for observation, then also a multi-channel audio is available for spatial audio rendering.

Thus, each device of the surveillance network captures an audio signal associated with the audio scene and transfers the captured audio content to a master device operating as an audio scene server. In addition to the captured audio signal, also information that enables determining the information regarding the position of the captured audio signal (e.g. GPS coordinates) is preferably included in the information provided to the master device.

Preferably, the devices included in the network are located at different positions but still in close proximity to each other. The master device receives the audio content from the recording devices and keeps track of the recording positions. The master device then transmits a combined audio signal, determined for example as a downmix of a number of audio signals, to an observer observing the audio scene of the area.

It may be possible for the observer to choose a listening position within the audio scene, e.g. from the map view, whereby the master device adjusts the combined audio signal to correspond to audio signal theoretically heard in the desired listening position and provides the adjusted audio signal to the observer.

As a further field of application, the audio surveillance network may be created as a virtual connection with a group of mobile phones. For example, family members may form a surveillance network that is monitoring only certain emergency situation or audio context classes. The surveillance network is virtual in the sense that it is not activated until at least one of the devices detects audio content of interest, such as breaking glass, sudden noise blasts, a cry for help etc. Other members of the virtual network are then alarmed, wherein the alarm may contain e.g. information about the type of the audio event, context class, location, motion, temperature and any other context information available in the alarming device. The virtual surveillance network could be constantly on, for example, via a packet data service of a cellular network.

A skilled man appreciates that any of the embodiments described above may be implemented as a combination with one or more of the other embodiments, unless there is explicitly or implicitly stated that certain embodiments are only alternatives to each other.

FIG. 3 illustrates a simplified structure of an apparatus (TE) capable of operating as a mobile device in the system according to the invention. The apparatus (TE) can be, for example, a mobile terminal, a MP3 player, a PDA device, a laptop computer (PC) or any other data processing device. The apparatus (TE) comprises I/O means (I/O), a central processing unit (CPU) and memory (MEM). The memory (MEM) comprises a read-only memory ROM portion and a rewriteable portion, such as a random access memory RAM and FLASH memory. The information used to communicate with different external parties, e.g. a CD-ROM, other devices and the user, is transmitted through the I/O means (I/O) to/from the central processing unit (CPU). If the apparatus is implemented as a mobile station, it typically includes a transceiver Tx/Rx, which communicates with the wireless network, typically with a base transceiver station (BTS) through an antenna. User Interface (UI) equipment typically includes a display, a keypad, a microphone, loudspeaker and connecting means for headphones. The apparatus may further comprise connecting means MMC, such as a standard form slot for various hardware modules, or for integrated circuits IC, which may provide various applications to be run in the apparatus.

Accordingly, the surveillance process according to the invention may be executed in a central processing unit CPU or in a dedicated digital signal processor DSP (a parametric code processor) of the apparatus. The apparatus initiating the network utilizes the wireless communication means, i.e. the transceiver Tx/Rx and the CPU, to establish connections to the other mobile devices. The apparatus comprises one or more sensors, e.g. the microphone for capturing audio signals. The audio signals may also be received from the other mobile devices in the network through the transceiver Tx/Rx. The audio signals are analysed in the CPU, and in response to detecting a predetermined event in the audio signals, an alarm is invoked e.g. via the display or the loudspeaker of the apparatus, or a signal is transmitted to one or more of the mobile devices in the network via the transceiver Tx/Rx and the antenna.

The functionalities of the embodiments may be implemented in an apparatus, such as a mobile terminal, also as a computer program which, when executed in a central processing unit CPU or in a dedicated digital signal processor DSP, affects the terminal device to implement procedures of the invention. Functions of the computer program SW may be distributed to several separate program components communicating with one another. The computer software may be stored into any memory means, such as the hard disk of a PC or a CD-ROM disc, from where it can be loaded into the memory of mobile terminal. The computer software can also be loaded through a network, for instance using a TCP/IP protocol stack.

It is also possible to use hardware solutions or a combination of hardware and software solutions to implement the inventive means. Accordingly, the above computer program product can be at least partly implemented as a hardware solution, for example as ASIC or FPGA circuits, in a hardware module comprising connecting means for connecting the module to an electronic device, or as one or more integrated circuits IC, the hardware module or the ICs further including various means for performing said program code tasks, said means being implemented as hardware and/or software.

It is obvious that the present invention is not limited solely to the above-presented embodiments, but it can be modified within the scope of the appended claims.

The invention claimed is:

1. A method comprising:
    receiving a selected connection type indication;
    determining, by a mobile device, candidate devices suitable for establishing a network from among a group of detected devices such that one or more of the detected devices are determined to be suitable for establishing the network and one or more of the detected devices are determined to not be suitable for establishing the network, wherein the first mobile device is a portable computing device, and wherein determining suitable devices is based on hardware capabilities of respective devices including sensor type, sensor quality, device processing power, or memory size;
    setting up the network of a plurality of mobile devices based on the determination of suitable candidate devices and the selected connection type;
    obtaining sensory data from at least one mobile device of the network;
    analysing, by the mobile device, the obtained sensory data in order to detect at least one predetermined event, wherein analysing the obtained sensory data comprises identifying a predetermined event in an instance in which the sensory data is classifiable into a predetermined classification pattern associated with at least one predetermined event and identifying another predetermined event in an instance in which a sensor parameter of the sensory data exceeds of a threshold value; and
    in response to detecting at least one predetermined event, providing an indication about the detected event to at least one mobile terminal of the network, wherein the indication comprises location information associated with the mobile device.

2. The method according to claim 1, wherein setting up the network comprises:

requesting one or more candidate devices to be included in the network; and establishing data transfer connections at least between said first mobile device and each of the candidate devices accepting the request.

3. The method according to claim 2, wherein determining candidate devices suitable for establishing the network comprises:

detecting mobile devices within a predetermined geographical area; and selecting, from the group of detected mobile devices, candidate devices suitable for establishing the network.

4. The method according to claim 2, wherein the predetermined geographical area is determined by a distance relative to the first mobile device or by positioning data relative to a geographical area.

5. The method according to claim 2, wherein the devices are selected at least partly based on the type of the detected devices.

6. The method according to claim 2, wherein determining candidate devices suitable for establishing the network comprises selecting one or more predetermined candidate devices.

7. The method according to claim 2, the method further comprising:

managing, by the first mobile device, the network on the basis of the detected events, mobile devices disconnecting from the network and/or interruptions in the data transfer connections.

8. The method according to claim 1, wherein setting up the network comprises:

receiving information about one or more devices in the network; and establishing data transfer connection to at least one of said one or more devices in the network.

9. An apparatus comprising at least one processor and at least one memory including computer program code, the memory and the computer program code configured to, with the at least one processor, cause the apparatus to perform at least the following:

receive a selected connection type indication;

determine, by a mobile device, candidate devices suitable for establishing a network from among a group of detected devices such that one or more of the detected devices are determined to be suitable for establishing the network and one or more of the detected devices are determined to not be suitable for establishing the network, wherein the first mobile device is a portable computing device, and wherein determining suitable devices is based on hardware capabilities of respective devices including sensor type, sensor quality, device processing power, or memory size;

set up the network of a plurality of mobile devices based on the determination of suitable candidate devices and the selected connection type;

obtain sensory data from at least one mobile device of the network;

analyse, by the mobile device, the obtained sensory data in order to detect at least one predetermined event, wherein analyse the obtained sensory data further comprises identifying a predetermined event in an instance in which the sensory data is classifiable into a predetermined classification pattern associated with at least one predetermined event and identifying another predetermined event in an instance in which a sensor parameter of the sensory data exceeds of a threshold value, and in response to detecting at least one predetermined event, the apparatus provides an indication about the detected event to at least one mobile terminal of the network.

10. The apparatus according to claim 9, wherein the apparatus is further arranged to request one or more candidate devices to be included in the network; and establish data transfer connections to each of the candidate devices accepting the request.

11. The apparatus according to claim 10, wherein the apparatus is further arranged to detect mobile devices within a predetermined geographical area; and select, from the group of detected mobile devices, candidate devices suitable for establishing the network.

12. The apparatus according to claim 10, wherein the predetermined geographical area is determined by a distance relative to the first mobile device or by positioning data relative to a geographical area.

13. The apparatus according claim 10, wherein the devices are selected at least partly based on the type of the detected devices.

14. The apparatus according to claim 10, wherein the apparatus is further arranged to, when determining candidate devices suitable for establishing the network, select one or more predetermined candidate devices.

15. The apparatus according to claim 10, said apparatus being arranged to manage the network on the basis of the detected events, mobile devices disconnecting from the network and/or interruptions in the data transfer connections.

16. The apparatus according to claim 9, wherein the apparatus is further arranged to, when setting up the network, to receive information about one or more devices in the network; and establish data transfer connection to at least one of said one or more devices in the network.

17. The apparatus according to claim 9, said apparatus being arranged to receive sensory data from one or more mobile devices.

18. The apparatus according to claim 9, wherein the sensory data comprises location information associated with the sensory data.

19. A computer program product, stored on a non-transitory computer readable medium and executable in a data processing device, for processing sensory data, the computer program product comprising a computer program code section for:

receiving a selected connection type indication;

determining candidate devices suitable for establishing a network from among a group of detected devices such that one or more of the detected devices are determined to be suitable for establishing the network and one or more of the detected devices are determined to not be suitable for establishing the network, wherein the first mobile device is a portable computing device, and wherein determining suitable devices is based on hardware capabilities of respective devices including sensor type, sensor quality, device processing power, or memory size;

controlling setting up the network of a plurality of mobile devices based on the determination of suitable candidate devices and the selected connection type;

obtaining sensory data from at least one mobile device of the network;

analysing the obtained sensory data in order to detect at least one predetermined event wherein analysing the obtained sensory data comprises identifying a predetermined event in an instance in which the sensory data is classifiable into a predetermined classification pattern associated with at least one predetermined event and identifying another predetermined event in an instance in which a sensor parameter of the sensory data exceeds of a threshold value; and providing, in response to detecting at least one predetermined event, an indication about the detected event to at least one mobile terminal of the network.

20. A computer program product, stored on a non-transitory computer readable medium and executable in a data processing device, for processing sensory data, the computer program product comprising a computer program code section for:

receiving of a request for the data processing device to be included in a network of a plurality of mobile devices comprising a selected connection type, wherein the request is received in response to a mobile device determining that the data processing device is a suitable candidate for establishing the network from among a group of detected devices such that one or more of the detected devices are determined to be suitable for establishing the network and one or more of the detected devices are determined to not be suitable for establishing the network, wherein the mobile device is a portable computing device, and wherein determining suitable devices is based on hardware capabilities of respective devices including sensor type, sensor quality, device processing power, or memory size;

accepting said request;

establishing a data transfer connection to at least the mobile device sending said request based on the selected connection type;

obtaining sensory data from one or more sensors of the data processing device about the surroundings of the device;

analysing the obtained sensory data in order to detect at least one predetermined event, wherein analysing the obtained sensory data comprises identifying a predetermined event in an instance in which the sensory data is classifiable into a predetermined classification pattern associated with at least one predetermined event and identifying another predetermined event in an instance in which a sensor parameter of the sensory data exceeds of a threshold value; and causing the transmission of the at least one predetermined event with location information associated with the mobile device to at least one mobile device in said network.

* * * * *